United States Patent

Chopin et al.

[11] Patent Number: 5,883,037
[45] Date of Patent: *Mar. 16, 1999

[54] THERMALLY STABLE/HIGHLY REDUCIBLE CATALYST COMPOSITIONS COMPRISING ALUMINA AND THE OXIDES OF CERIUM AND ZIRCONIUM

[75] Inventors: Thierry Chopin, Saint-Leu La Foret; Olivier Touret, La Rochelle, both of France; Gabriel Vilmin, Princeton, N.J.

[73] Assignee: Rhone-Poulenc Chimie, Courbevoie Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 452,711

[22] Filed: May 30, 1995

[30] Foreign Application Priority Data

May 27, 1994 [FR] France .................................. 94-06447

[51] Int. Cl.$^6$ .............................. B01J 23/00; B01J 23/16; B01J 23/08; B01J 20/00
[52] U.S. Cl. .......................... 502/308; 502/415; 502/353; 502/304; 502/349; 502/302; 502/311; 502/355; 501/105; 501/152
[58] Field of Search ..................................... 502/129, 415, 502/304, 349, 353, 355, 311, 308, 302; 501/105, 152

[56] References Cited

U.S. PATENT DOCUMENTS

| | | | |
|---|---|---|---|
| 2,152,908 | 4/1939 | Morrell et al. | 502/302 |
| 4,294,726 | 10/1981 | Bozon et al. | 502/304 |
| 5,045,521 | 9/1991 | Lox et al. | 502/304 |
| 5,073,532 | 12/1991 | Domesle et al. | 502/304 |
| 5,075,276 | 12/1991 | Ozawa et al. | 502/304 |
| 5,200,384 | 4/1993 | Funanbiki et al. | 502/304 |
| 5,260,249 | 11/1993 | Shiraishi et al. | 502/304 |
| 5,427,995 | 6/1995 | Ziebarth et al. | 502/415 |
| 5,532,198 | 7/1996 | Chopin et al. | 502/349 |
| 5,607,892 | 3/1997 | Chopin et al. | 502/355 |
| 5,712,218 | 1/1998 | Chopin et al. | 502/349 |
| 5,723,403 | 3/1998 | Durand et al. | 502/304 |
| 5,736,482 | 4/1998 | Durand et al. | 502/304 |
| 5,750,458 | 5/1998 | Kennelly et al. | 502/302 |
| 5,762,894 | 6/1998 | Takatori et al. | 502/304 |
| 5,763,676 | 6/1998 | Fischer et al. | 502/308 |

FOREIGN PATENT DOCUMENTS

| | | | |
|---|---|---|---|
| 0 125 565 | 11/1984 | European Pat. Off. | 502/304 |
| 0 170 588 | 2/1986 | European Pat. Off. | 502/304 |
| 0 201 070 | 11/1986 | European Pat. Off. | 502/304 |
| 0251752 | 1/1988 | European Pat. Off. . | |
| 0 262 962 | 4/1988 | European Pat. Off. | 502/349 |
| 0 314 057 | 5/1989 | European Pat. Off. | 502/304 |
| 0 329 302 | 8/1989 | European Pat. Off. | 502/304 |
| 0 459 534 | 12/1991 | European Pat. Off. | 502/304 |
| 0 495 534 | 7/1992 | European Pat. Off. | 502/304 |
| 0 507 590 | 10/1992 | European Pat. Off. | 502/304 |
| 0588691 | 3/1994 | European Pat. Off. . | |
| 2590887 | 6/1987 | France . | |
| 2 595 265 | 9/1987 | France | 502/304 |
| 25 01 810 | 8/1975 | Germany | 502/302 |
| 37 37 419 | 5/1988 | Germany | 502/304 |
| 38 03 122 | 7/1989 | Germany | 502/304 |
| 38 30 319 | 7/1989 | Germany | 502/304 |
| 40 04 572 | 8/1990 | Germany | 502/304 |
| 55-139832 | 11/1980 | Japan | 502/304 |
| 56-152742 | 11/1981 | Japan | 502/304 |
| 58-124544 | 7/1983 | Japan | 502/304 |
| 62-282641 | 12/1987 | Japan | 502/349 |
| 63-20036 | 1/1988 | Japan | 502/304 |
| 64-11643 | 1/1989 | Japan | 502/304 |
| 2-214541 | 8/1990 | Japan | 502/349 |
| 3-131343 | 6/1991 | Japan | 502/304 |
| 3-196841 | 8/1991 | Japan | 502/304 |
| 4-4043 | 1/1992 | Japan | 502/304 |
| 6-114264 | 4/1994 | Japan | 502/304 |
| WO 90/14887 | 12/1990 | WIPO | 502/304 |
| WO90/14888 | 12/1990 | WIPO | 502/304 |
| WO 93/16799 | 9/1993 | WIPO | 502/302 |

OTHER PUBLICATIONS

N.N. Greenwood, A. Earnshaw, "Chemistry of the Elements", Pergamon Press, pp. 669, 1120, 1254, 1437, 1986.

Journal of Alloys and Compounds, vol. 193, 1993, pp. 298–299, T. Murota et al.

*Primary Examiner*—Mark L. Bell
*Assistant Examiner*—J. Pasterczyk
*Attorney, Agent, or Firm*—Burns, Doane, Swecker & Mathis, L.L.P.

[57] ABSTRACT

Thermally stable/highly reducible catalyst compositions, well suited for the catalytic conversion of exhaust gases emanating from internal combustion engines notably vehicular exhaust gases, comprise alumina, the oxides of cerium praseodymium and zirconium, and, optionally, at least one other oxide of bismuth, of a rare earth, or of an element of group VIII of the Periodic Table, and exhibit a stabilized hydrogen-absorption capacity up to a temperature of at least 1,000° C.

32 Claims, No Drawings

THERMALLY STABLE/HIGHLY REDUCIBLE CATALYST COMPOSITIONS COMPRISING ALUMINA AND THE OXIDES OF CERIUM AND ZIRCONIUM

BACKGROUND OF THE INVENTION

1. Technical Field of the Invention

The present invention relates to alumina-, cerium oxide- and zirconium oxide-based compositions exhibiting high reducibility, to a process for the preparation thereof and to the use of same as catalysts, in particular for the treatment or conversion of exhaust gases emanating from internal combustion engines.

2. Description of the Prior Art

It is known to this art that catalysts may be in the form of a carrier, such as a heat-resistant ceramic unitary shaped article or monolith, or a metallic substrate, coated with a coating typically comprising a material that provides a porous layer, e.g., alumina, and catalytically active elements such as precious metals and other elements, for example rare earth oxides, in particular cerium oxide or zirconium oxide, which may impart their own catalytic function and/or a carrier function for precious metals. This coating is typically referred to as a "washcoat."

The alumina/oxides combination, or the compound based on these elements, must provide a number of properties to be effective as a catalyst. One of these properties is reducibility, which signifies, both here and in the description to follow, the capacity to become reduced under a reducing atmosphere and to become reoxidized under an oxidizing atmosphere. Another such property is stability under temperature, with "stability" connoting the stability of the specific surface area of the composition. Indeed, the composition must retain a sufficiently large surface area after having been exposed to high temperatures. "Stability" also connotes the capacity to store hydrogen or oxygen. As regards the specific surface area, this capacity must not vary appreciably after several cycles of exposure to high temperature.

SUMMARY OF THE INVENTION

Accordingly, a major object of the present invention is the provision of novel catalyst compositions possessing improved reducibility and stability.

Briefly, the present invention features improved catalysts comprising alumina, cerium oxide and zirconium oxide, and having a stabilized hydrogen-absorption capacity up to a temperature of at least 1,000° C.

The present invention also features a process for the preparation of such improved catalyst compositions, comprising:

(a) preparing a first mixture containing a cerium acetate and a zirconium salt, or colloidal solution thereof, (b) contacting said first mixture with a basic medium and maintaining the reaction medium thus formed at a basic pH, (c) separating the precipitate which forms from the reaction medium, (d) preparing a second mixture containing the precipitate thus obtained and alumina, (e) spray-drying said second mixture, and (f) calcining the dried material.

This invention also features precursors of the compositions described above, recovered following the step (e) of the process entailing drying of the second mixture.

Too, the present invention also features catalysts comprising the above compositions, in particular for the treatment or conversion of exhaust gases emanating from internal combustion engines.

DETAILED DESCRIPTION OF BEST MODE AND PREFERRED EMBODIMENTS OF THE INVENTION

More particularly according to the present invention, the subject compositions are based on alumina, cerium oxide, and zirconium oxide.

They may, however, also include additional elements, which may be selected from among bismuth, rare earths, and the elements of group VIII of the Periodic Table.

By the term "rare earth" are intended the elements selected from among yttrium and the elements of the Periodic Table having an atomic number ranging from 57 to 71, inclusive. The Periodic Table is that published in the Supplement to the *Bulletin de la Société de France,* No. 1 (January 1966).

The other elements that may be added include elements used to stabilize alumina. They may be selected from among barium, silicon, and zirconium. It should be appreciated that the rare earths may also be used to stabilize the alumina.

Yet other elements include lanthanum, praseodymium, and iron.

The proportion of alumina in the compositions, according to the invention is preferably at least 10% by weight relative to the total weight of the composition. It is typically at most 90%, and, more especially, ranges from 15% to 80%. In preferred embodiments of the invention, this proportion may range from 15% to 40%, from 40% to 60%, and from 60% to 80%. As regards the respective proportions of the cerium and other remaining elements, i.e., zirconium and other added elements, the cerium preferably constitutes at least 50% by weight of the cerium/additional elements combination.

The compositions according to this invention present a number of advantages.

One basic advantage thereof is a stabilized reducibility, which signifies the preservation of the hydrogen-absorption capacity at a sufficient value after several cycles of exposure of the composition to elevated temperatures of up to 1,000° C. and over a time period of up to six hours. More specifically, the difference between the values of the hydrogen-absorption capacity as measured between two consecutive cycles is at most 50%, preferably at most 25%, and more preferably at most 10%.

Moreover, the compositions according to the invention in general possess a hydrogen-absorption capacity of at least 10 ml/g of composition, and preferably at least 20 ml/g, and more preferably from 20 to 50 ml/g.

The compositions according to the invention may have a widely varying apparent density. For example, this density may be at least 0.2 $g/cm^3$, but may, more particularly, range from 0.4 to 1.4 $g/cm^3$ and, even more preferably, may range from 0.5 to 0.8 $g/cm^3$.

Another advantage presented by the compositions according to the invention is their specific surface area, namely, the BET specific surface area as determined by nitrogen adsorption according to ASTM Standard D 3663-78 based on the Brunauer-Emmett-Teller technique described in *Journal of the American Chemical Society,* 60, 309 (1938). The specific surface areas of the compositions according to the invention are reported below for the different embodiments after calcination at 900° C. for six hours, at 940° C. for three hours, and at 1,050° C. for two hours. The preferred values are included in parentheses.

| Proportion of alumina in % | Surface area (m²/g) | | |
|---|---|---|---|
| by weight | at 900° C. | at 940° C. | at 1,050° C. |
| 15–40 | >25 (>35) | >25 (>35) | >15 (>25) |
| 40–60 | >50 (>60) | >50 (>60) | >35 (>45) |
| 60–85 | >80 (>90) | >80 (>90) | >50 (>60) |

Another advantage presented by the compositions according to the invention is the manner in which the other constituents are dispersed in the alumina. This dispersion is such that the ranges of heterogeneity are less than 100 nm², preferably less than 50 nm², and even more preferably less than 25 nm². This connotes that, in the chemical constitution of the compositions according to the invention, there is no difference between surface areas of the values indicated above. These homogeneity properties are determined by MET-EDS analysis. More particularly, the range of heterogeneity was measured using the Energy Dispersion Spectroscopy (EDS) mapping technique, by means of an Electron Transmission Microscopy (MET) electron probe.

In another embodiment of the invention, zirconium and, as the particular case dictates, the additional elements are present in the composition at least partially as a solid solution in the cerium.

Lastly, in an especially preferred embodiment of the invention, the subject compositions further comprise cerium and zirconium oxides, and praseodymium and iron oxides.

The process for the preparation of the compositions according to the invention will now be more fully described.

The first step of the procedure entails preparing, normally as a solution or suspension, a mixture of cerium acetate and of a zirconium salt or colloidal solution thereof and, optionally, of a salt or colloidal solution of another additional element of the type described above.

The acetate is the preferred salt. Other salts include the chlorides and the salts of carboxylic acids, such as the oxalates or formates. When possible, an acetate is used.

In the next step, the aforesaid mixture is contacted with a basic medium. By the term "basic medium" is intended any medium having a pH of more than 7. The basic medium is typically an aqueous solution containing a base. Hydroxide compounds can be used as this base, including alkali or alkaline earth metal hydroxides. Secondary, tertiary, or quaternary amines can also be used. However, amines and liquid ammonia are typically preferred, since they reduce the risks of pollution caused by alkali or alkaline earth metal cations. Urea may also be used.

The above solution or mixture is contacted with the basic medium under conditions such that the pH of the reaction mixture thus formed remains basic.

Preferably, this pH value is at least 9, and more particularly is at most 11. Preferably, this value ranges from 9.5 to 11.

The above mixture and the basic medium can be contacted by incorporating the mixture into the basic medium. It is also possible to provide a continuous contacting, the pH requirement being fulfilled by adjusting the respective flow rates of the mixture and of the basic medium.

In another preferred embodiment of the invention, the procedure is carried out under conditions such that, when the solution or mixture is contacted with the basic medium, the pH of the reaction medium thus formed is maintained constant. These conditions can be attained by adding an additional amount of base to the mixture formed when the mixture is incorporated into the basic medium.

The contacting is advantageously carried out at ambient temperature.

Following the reaction, a precipitate or suspension is formed which, if necessary, can be separated from the reaction medium employing any known means. The separated product can be washed.

The next step of the procedure comprises forming a second mixture combining the product thus obtained and the alumina.

Any type of alumina can be used having a specific surface area adequate for catalytic applications. Exemplary thereof are aluminas formed via the rapid dehydration of at least one aluminum hydroxide, e.g., bayerite, hydrargillite or gibbsite, nordstrandite, and/or at least one aluminum oxyhydroxide, such as boehmite, pseudoboehmite, and diaspore.

In a preferred embodiment of the invention, a stabilized alumina is employed. The stabilizing element may include rare earths, barium, silicon, and zirconium. The rare earth may include, most notably, lanthanum or a lanthanum/neodymium admixture.

The stabilized alumina is conventionally prepared, in particular by impregnating the alumina with solutions of salt such as nitrates, stabilizing elements as specified above, or by the co-drying of a precursor of alumina and of salts of these elements, followed by calcination.

Moreover, the stabilized alumina may also be prepared via the technique in which the alumina powder obtained from the rapid dehydration of an aluminum hydroxide or oxyhydroxide is subjected to a ripening or aging operation in the presence of a stabilizing agent comprising a lanthanum and, optionally, a neodymium compound. Such a compound may be, more particularly, a salt. Ripening or aging may be carried out by placing the alumina in suspension in water, then heating the suspension to a temperature of from 70° to 110° C., for example. After ripening, the alumina is thermally treated.

Another preparative technique comprises conducting a similar treatment, but using barium.

The stabilizer content expressed by weight of stabilizer oxide relative to the stabilized alumina normally ranges from 1.5% to 15%, and more preferably from 2.5% to 11%.

The mixture of the alumina and of the product obtained from the precipitation step is then dried.

The drying is preferably carried out by atomization, i.e., by spraying the mixture into a heated atmosphere (spray-drying). Spray-drying may be effected using any conventional sprayer, e.g., a spray nozzle of the sprinkling rose or other type. The so-called turbine sprayers may also be used. As regards the various spray techniques that can be used, see the basic text by Masters, *Spray-Drying* (Second Edition, 1976, George Godwin, London).

The spray-drying operation may also be carried out in a "flash" vessel, e.g., in a vessel described, in particular, in French Patent Applications Nos. 2,257,326, 2,419,754, and 2,431,321, each assigned to the assignee hereof. In this event, the treatment gases (hot gases) downwardly descend in a helical trajectory and converge into a vortex. The mixture to be dried is injected along a path merging with the axis of symmetry of the helical pathways of said gases, thereby completely transferring the momentum of the gases to the mixture to be treated. The gases thus perform a dual function: first, the spraying function, that is, the transformation of the initial mixture into fine droplets; and, second, the flash drying of the droplets thus produced. Moreover, the extremely short retention time (normally less than 1/10 of a second) of the particles in the vessel presents the advantage, among others, of reducing any risks of overheating as a consequence of an excessively lengthy contact with the hot gases.

Depending on the respective flow rates of the gases and the mixture to be dried, the inlet temperature of the gases ranges from 400° to 900° C., and more preferably from 600° to 800° C. The temperature of the dry solids ranges from 100° to 250° C., and preferably from 125° to 200° C.

Following this drying step, a dry product constituting a precursor of the compositions according to the invention is obtained.

The precursor is transformed into the composition according to the invention by calcination, which is carried out at a temperature sufficient to provide the constituents of the composition in the form of the oxides thereof. The calcination time decreases as the temperature is increased. The calcination is typically carried out in air. The compositions according to the invention are generally obtained beginning at a temperature of 300° C., and more particularly, of 600° C.

The compositions thus obtained can be used for the production of catalysts. They may thus be used in the manufacture of catalysts, most notably catalysts for the treatment or conversion of exhaust gases emanating from internal combustion engines. Such catalysts comprise a substrate and a coating therefor. The substrate may be metallic or a heat-resistant ceramic shaped article or monolith. The coating may be provided via conventional washcoat-manufacturing techniques from a composition according to the invention.

In order to further illustrate the present invention and the advantages thereof, the following specific examples are given, it being understood that same are intended only as illustrative and in nowise limitative.

In said examples to follow, all parts, percentages and proportions are given by weight, unless otherwise indicated.

Also in said examples to follow, the hydrogen-absorption capacity was measured by programmed temperature reduction in the following manner: A silica vessel and a 1.5 g sample were employed. The gas was hydrogen in a proportion of 5% by volume in argon and at a flow rate of 20 ml/min. The temperature was increased from ambient temperature to 1,000° C., at the rate of 10° C./min. A detector of thermal conductivity was employed to detect the signal at 70 mA. Hydrogen absorption was calculated based on the missing surface area of the hydrogen signal from the baseline at ambient temperature to the baseline at 1,000° C.

To measure the stability of the hydrogen-absorption capacity, following the first measurement made under the conditions described above, the sample was calcined in air at 1,000° C. in a static oven for six hours. This sample was then analyzed for hydrogen-absorption capacity, under the same conditions.

EXAMPLE 1

This example relates to the formulation of a composition having the following constituents:

50% $Al_2O_3/La_2O_3$ (97%/3%)
50% $CeO_2/ZrO_2/Pr_6O_{11}/Fe_2O_3$ (56%/30%/7%/7%)

(a) Preparation of the alumina

In a 2 l vessel, 160.1 g of an alumina precursor (Versal 250 marketed by La Roche, containing 72.7% $Al_2O_3$) were added to 1,200 g of water while stirring. 13.38 g of a lanthanum nitrate solution (26.91% $La_2O_3$) were added and the volume of the mixture was adjusted to 1,850 ml with water. The mixture was atomized while stirring constantly (outlet temperature 110° C). The powder obtained was calcined for two hours at 600° C. 120 g of transition alumina having a specific surface area of 266 $m^2/g$ were obtained.

(b) Preparation of the precursor

The following materials were added to a 2 liter vessel containing a small amount of water:

(i) 298.61 g cerium acetate (12.91% $CeO_2$), (ii) 9.63 praseodymium acetate (47.27% praseodymium oxide), (iii) 83.56 g iron acetate (5.44% $Fe_2O_3$), (iv) 89.68 zirconium acetate (21.74% $ZrO_2$).

The volume was adjusted to 1,350 ml with water, and the mixture was stirred until complete dissolution was attained.

In a 4 liter vessel, 415 g ammonium hydroxide (29% $NH_3$) were diluted in water until a total volume of 2,600 ml was provided.

Under vigorous stirring, the preliminarily prepared acetate solution was added to the liquid ammonia solution. The pH of the reaction medium was 10. A chestnut-colored precipitate was obtained.

65 g of the previously prepared alumina were added to the mixture. The mixture was adjusted to a total volume of 4 liters under vigorous stirring and was atomized (inlet temperature was 250° C., outlet temperature 110° C.). A chestnut-colored precipitate was obtained.

(c) Preparation of the composition

The precursor was calcined at 600° C. for two hours. A composition having an apparent density of 0.5 $g/cm^3$ was obtained.

After an additional heat treatment for two hours at 900° C., the powder had a specific surface area of 80.8 $m^2/g$. The specific area was 77.5 $m^2/g$ after calcination for three hours at 940° C., and 52 $m^2/g$ after calcination for two hours at 1,050° C. Hydrogen-absorption capacity was 20 ml/g, and the same capacity was observed during a second identical cycle. Lastly, X-ray analysis evidenced that the zirconium, the iron, and the praseodymium were present as a solid solution in the cerium.

EXAMPLES 2 TO 8

The procedure of Example 1 was repeated, while varying the proportions of the various constituents. The results obtained are reported in the Table below:

TABLE

| Examples | Composition (%) | Density ($g/cm^3$) | Specific surface area after 3 h at 940° C. and 2 h at 1050° C. (m2/g) | Hydrogen-absorption capacity (ml $H_2/g$) |
|---|---|---|---|---|
| 2 | 70 $Al_2O_3/La_2O_3$(97/3) 30 $CeO_2/ZrO_2/Pr_6O_{11}/Fe_2O_3$ (56/30/7/7) | 0.44 | 122.3 76 | 12.3 |
| 3 | 60 $Al_2O_3/La_2O_3$(97/3) | 0.49 | 95.7 | 16.3 |

TABLE-continued

| Examples | Composition (%) | Density (g/cm³) | Specific surface area after 3 h at 940° C. and 2 h at 1050° C. (m2/g) | Hydrogen-absorption capacity (ml H$_2$/g) |
|---|---|---|---|---|
| | 40 CeO$_2$/ZrO$_2$/Pr$_6$O$_{11}$/Fe$_2$O$_3$ (56/30/7/7) | | 65 | |
| 4 | 40 Al$_2$O$_3$/La$_2$O$_3$(97/3) 60 CeO$_2$/ZrO$_2$/Fe$_2$O$_3$ (60.5/32.5/7) | | | 23.5 (cycle 1) 18.4 (cycle 2) |
| 5 | 40 Al$_2$O$_3$/La$_2$O$_3$(97/3) 60 CeO$_2$/ZrO$_2$ (58/42) | 0.6 | 77.5 50 | 22.8 |
| 6 | 40 Al$_2$O$_3$/La$_2$O$_3$(97/3) 60 CeO$_2$/ZrO$_2$/Pr$_6$O$_{11}$/Fe$_2$O$_3$ (56/30/7/7) | 0.53 | 63.6 41 | 24.5 (cycle 1) 23.6 (cycle 2) |
| 7 | 30 Al$_2$O$_3$/La$_2$O$_3$(97/3) 70 CeO$_2$/ZrO$_2$/Pr$_6$O$_{11}$/Fe$_2$O$_3$ (56/30/7/7) | 0.62 | 49 28 | 27.7 (cycle 1) 26.2 (cycle 2) |
| 8 | 20 Al$_2$O$_3$/La$_2$O$_3$(97/3) 80 CeO$_2$/ZrO$_2$/Pr$_6$O$_{11}$/Fe$_2$O$_3$ (56/30/7/7) | 0.79 | 32.8 16 | 32.5 (cycle 1) 29.4 (cycle 2) |

In Examples 2, 3 and 5, the hydrogen-absorption capacity did not vary appreciably between the two cycles. Furthermore, the zirconium, iron and praseodymium were present in the composition of Example 6 in the form of a solid solution in cerium.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermally stable/reducible powder composition of matter comprising alumina and the oxides of cerium, praseodymium and zirconium, and exhibiting a stabilized hydrogen-absorption capacity up to a temperature of at least 1,000° C.

2. The thermally stable/reducible composition as defined by claim 1, further comprising at least one oxide of bismuth, of a second rare earth, or of an element of group VIII of the Periodic Table.

3. The thermally stable/reducible composition as defined by claim 1, further comprising an alumina stabilizer.

4. A thermally stable/reducible powder composition of matter comprising alumina and the oxides of cerium, lanthanum, praseodymium, iron and zirconium, and exhibiting a stabilized hydrogen-absorption capacity up to a temperature of at least 1,000° C.

5. The thermally stable/reducible composition as defined by claim 4, comprising iron oxide.

6. The thermally stable/reducible composition as defined by claim 3, said alumina stabilizer comprising barium, silicon or zirconium.

7. The thermally stable/reducible composition as defined by claim 1, comprising at least 10% by weight of alumina.

8. The thermally stable/reducible composition as defined by claim 7, comprising from 15% to 40% by weight of alumina.

9. The thermally stable/reducible composition as defined by claim 7, comprising from 40% to 60% by weight of alumina.

10. The thermally stable/reducible composition as defined by claim 7, comprising from 60% to 80% by weight of alumina.

11. The thermally stable/reducible composition as defined by claim 1, comprising at least 50% by weight of cerium, relative to the total amount of cerium and zirconium.

12. The thermally stable/reducible composition as defined by claim 2, comprising at least 50% by weight of cerium, relative to the total amount of cerium, zirconium and the at least one oxide.

13. The thermally stable/reducible composition as defined by claim 1, exhibiting a variation in hydrogen-absorption capacity, after two consecutive cycles of exposure to a from ambient to a temperature of at least 1,000° C., of at most 50%.

14. The thermally stable/reducible composition as defined by claim 13, said variation in hydrogen-absorption capacity being at most 25%.

15. The thermally stable/reducible composition as defined by claim 14, said variation in hydrogen-absorption capacity being at most 10%.

16. The thermally stable/reducible composition as defined by claim 1, having a hydrogen-absorption capacity of at least 10 ml/g.

17. The thermally stable/reducible composition as defined by claim 16, having a hydrogen-absorption capacity of at least 20 ml/g.

18. The thermally stable/reducible composition as defined by claim 1, having an apparent density ranging from 0.4 to 1.4 g/cm³.

19. The thermally stable/reducible composition as defined by claim 8, having a BET specific surface area greater than 25 m²/g after calcination at 900° C. for 6 hours.

20. The thermally stable/reducible composition as defined by claim 9, having a BET specific surface area greater than 50 m²/g after calcination at 900° C. for 6 hours.

21. The thermally stable/reducible composition as defined by claim 10, having a BET specific surface area greater than 80 m²/g after calcination at 900° C. for 6 hours.

22. The thermally stable/reducible composition as defined by claim 1, at least partially comprising a solid solution of zirconium and cerium.

23. The thermally stable/reducible composition as defined by claim 2, at least partially comprising a solid solution of zirconium and, the at least one oxide cerium.

24. The thermally stable/reducible composition as defined by claim 1, having a chemical homogeneity such that the ranges of heterogeneity thereof are less than 100 nm².

25. The thermally stable/reducible composition as defined by claim 24, having a chemical homogeneity such that the ranges of heterogeneity thereof are less than 50 nm² .

26. The thermally stable/reducible composition as defined by claim 25, having a chemical homogeneity such that the ranges of heterogeneity thereof are less than 25 nm².

27. A process for the preparation of the thermally stable/reducible powder composition as defined by claim 1, comprising (a) providing a first admixture of cerium acetate and a zirconium and praseodymium salt or colloidal solution thereof, (b) intimately contacting said first admixture with a basic liquid medium and maintaining basic the pH of the reaction medium thus formed, (c) separating from said reaction the precipitate which forms, (d) forming a second admixture by intimately admixing said precipitate with alumina powder, (e) drying the second admixture, and (f) calcining the dried second admixture.

28. The process as defined by claim 27, comprising atomizing said second admixture to dryness.

29. The process as defined by claim 28, comprising maintaining the pH of said reaction medium at a value ranging from 9 to 11.

30. A catalyst coating effective for the treatment or conversion of exhaust gases emanating from internal combustion engines comprising the thermally stable/reducible composition as defined by claim 1.

31. The catalyst as defined by claim 30, comprising a substrate coated with said thermally stable/reducible composition.

32. A thermally stable/reducible powder composition of matter comprising alumina and the oxides of cerium, praseodymium, iron and zirconium, and exhibiting a stabilized hydrogen-absorption capacity up to a temperature of at least 1,000° C., the powder composition comprising at least 50% by weight of cerium values, relative to the total amount of cerium, praseodymium, iron and zirconium oxides.

* * * * *